No. 613,637. Patented Nov. 1, 1898.
N. C. BASSETT.
PROTECTIVE COVERING OR SHIELD FOR CHAIN BELTING.
(Application filed June 29, 1895.)
(No Model.) 2 Sheets—Sheet 1.
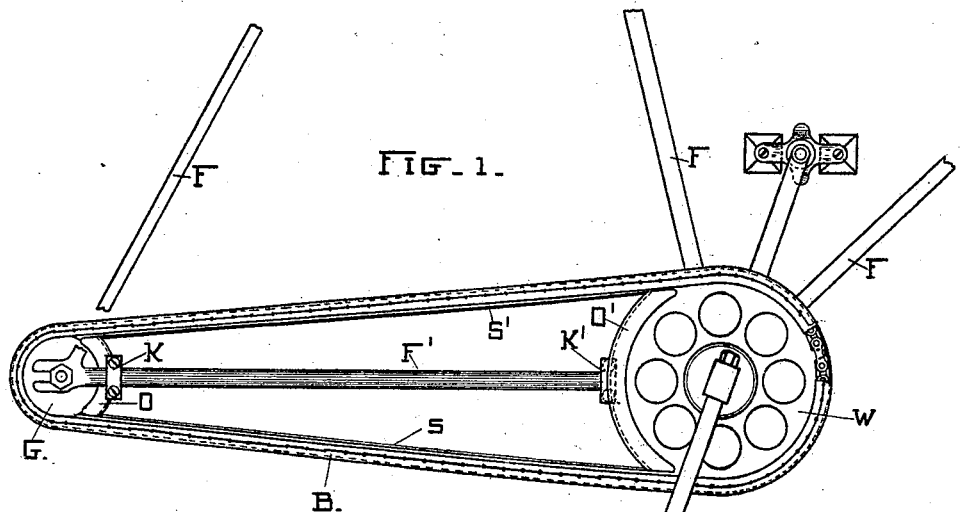
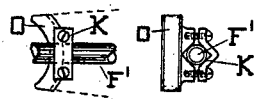
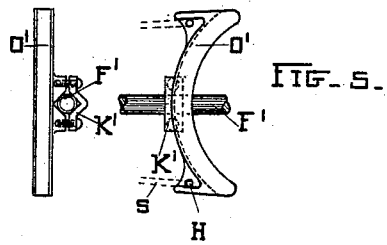
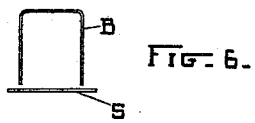
WITNESSES.
Henry W. Westendarp.
John H. Gibboney
INVENTOR
Norman C. Bassett

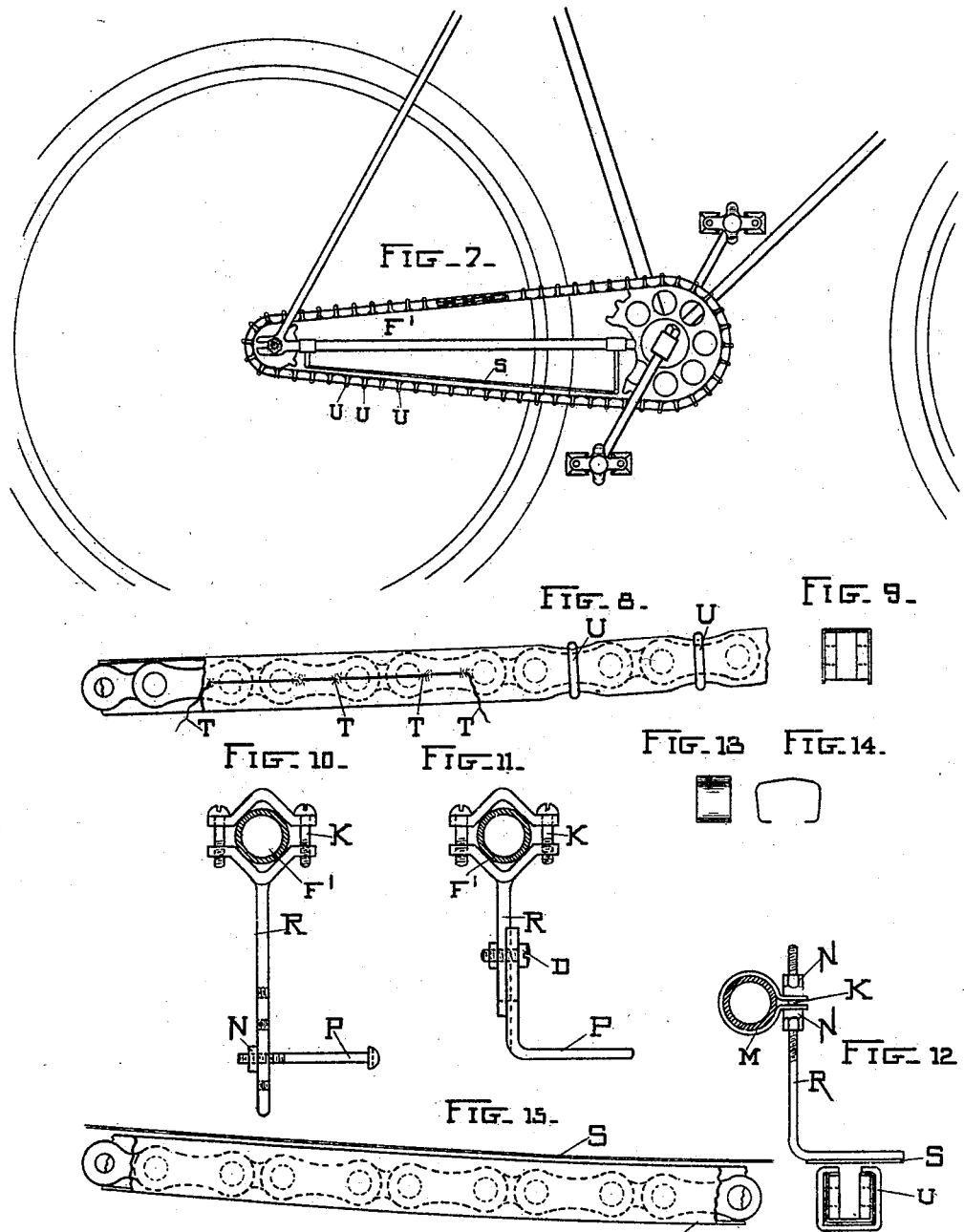

UNITED STATES PATENT OFFICE.

NORMAN C. BASSETT, OF LYNN, MASSACHUSETTS, ASSIGNOR TO BENJAMIN LOUIS TOQUET, OF WESTPORT, CONNECTICUT.

PROTECTIVE COVERING OR SHIELD FOR CHAIN BELTING.

SPECIFICATION forming part of Letters Patent No. 613,637, dated November 1, 1898.

Application filed June 29, 1895. Serial No. 554,433. (No model.)

*To all whom it may concern:*

Be it known that I, NORMAN C. BASSETT, a citizen of the United States, and a resident of Lynn, in the county of Essex and Commonwealth of Massachusetts, have invented certain new and useful Improvements in Protective Coverings or Shields for Chain Belting, of which the following is a specification.

The object of my invention is to provide a protective covering for chain belting for the purpose of keeping out dust, dirt, and grit, the presence of which causes undue friction between the elements of the chain, resulting in a loss of power and wear of the parts, and also to enable a dry lubricant, such as graphite, to be kept in contact with the chain during its motion.

My invention is particularly applicable to the sprocket-chains used in bicycle-gearing, which are ordinarily exposed to the dust and grit of roads and which in their unprotected condition soon become covered thereby, so that they become stiff and absorb a considerable amount of the power exerted for propulsion, while the hard silicious matter getting between the links and in the bearings results in a rapid wearing of the chain and renders lubrication ineffective.

The main part of the protective covering of my invention is attached to and closely fits the sprocket-chain, and it moves therewith. It is therefore made of some pliable material having great durability when subjected to continuous flexure or bending, such as soft rubber, leather, rawhide, or canvas, the rubber being preferred on account of its elasticity, which permits it to hug the chain closely and to bend without taking much power, while it can also be made very light in weight and is quite durable in use. This movable protective covering surrounds the sprocket-chain upon all sides except upon the inner surface, which must of course be left free for engagement with the teeth of the driving and driven sprocket-wheels. To protect this inner surface between the wheels, I employ an additional stationary shield, belt, or strip, one or more, which will be hereinafter described.

My invention concerns special devices for securing the movable protective covering to the chain, and this will also be described in detail hereinafter.

I will now refer to the drawings accompanying this specification, of which they form a part, to illustrate my invention, and in which—

Figure 1 is a view of so much of a bicycle as is necessary to show the application of my invention. Figs. 2, 3, 4, 5, and 6 illustrate supports for the stationary strip or shield. Fig. 7 is a partial view of a bicycle, showing my invention in a modified form; and Figs. 7 to 15, both inclusive, show details of arrangements and attachments, which will be referred to hereinafter.

In Fig. 1, F F, &c., are parts of the framing of a bicycle. W represents the driving sprocket-wheel, to which the cranks C are attached, and G is the smaller driven sprocket-wheel, secured to the shaft of the rear wheel as usual. As shown in this figure, the sprocket-chain has three of its sides—that is, all but its inner surface—entirely inclosed by a protective covering B. This covering is preferably made of pure rubber, but may, if desired, be made of leather, rawhide, or canvas. It is carefully fastened to the sprocket-chain at numerous points and preferably to every link thereof.

The protective covering constructed and applied as described does not, however, protect the inner surface of the chain above and below the frame F'. To shield this portion of the chain, I employ a flat belt or strip S S', stretched between suitable supports and closely adjusted to the chain without, however, touching it. Two such supports are shown in the figure attached, one each to the frame F' near the sprocket-wheels W and G, respectively, by clamps K K'. These supports may also constitute curved casings O O', embracing the teeth of that portion of the sprocket-wheels not engaged by the chain. The strips or shields S S' are secured to the outer ends of the casings O O' O O', respectively, and can be stretched to any desired extent by adjusting the distance separating the clamps K K'. With my invention so applied the bicycle may be run over very sandy or dusty roads, and the movable, pliable, and elastic covering B, the stationary strips or shields S S', and the casings O O' will effectually protect the chain from damage by dirt, dust, grit, or other foreign matter and save the loss of power which would otherwise be caused by its presence on the chain.

While it is advantageous, it is not essential to employ the casings O O' and the strip S', as very little foreign matter capable of clogging the chain is apt to stick to the under side of the chain, such matter naturally falling out, nor is it very apt to enter at the sprocket-wheels themselves; but it is always advisable to use the strip or belt S to prevent the chain from catching the dirt which falls from above and which may be thrown by the tires of the wheels in their revolution.

Figs. 3 and 4 are views in section, and Figs. 2 and 5 side views, respectively illustrating the supports for the belts or strips S S' and their mode of attachment to the frame F'. Similar letters to those used in Fig. 1 refer to similar parts, and the figures are almost self-explanatory. The casings O O' are of course made of some light material, which can be molded, pressed, or cast into the shape desired. They are, for instance, readily made of aluminium. The clamp K is placed, as shown, to one side of the casing O and is made in two parts held together by screws, whereby it may be secured to tubing of varying diameters used in the frame F'. Such a protective covering might be attached to the chain, as illustrated in Fig. 1 and to the left in Fig. 8—that is, by sewing it on—but I have found by trial that this is a tedious operation, is not likely to be performed properly or carefully, and is neither so secure nor so easily applied as the spring-metal clips illustrated to the right in this figure. The clips U U may be made of wire, but are preferably made of thin sheet metal (see Figs. 13 and 14) non-oxidizable in character and having considerable elasticity—such a metal, for example, as phosphor-bronze, or, rather, such an alloy as phosphor-bronze. They are sprung over the covering in its position on the chain at the middle portion of the links, a clip being preferably used for each link, and are held in place by their elasticity, as shown in Fig. 9; but it is better and safer to bend the ends of the clips inward, as shown in Figs. 13 and 14, so as to engage the edge of the link, though not projecting so far inward as to strike the teeth of the sprocket-wheels W and G. Fig. 12, which is an enlarged view of the chain in section with its covering attached, illustrates this bending of the edges of the clips. This construction insures the covering against displacement.

I have also found by using my invention continuously that it is quite advantageous to employ a fastening device between each link of the chain and the protective covering, for the reason that whatever material is used the covering in passing over the sprocket-wheels tends to open out or buckle at its inner edge, so that dust and dirt may fall therein and be actually caught and retained. By employing a separate fastening device for each link this opening of the covering in passing over the wheels is prevented.

Figs. 10, 11, and 12 represent modified forms of supports for the shield S of Figs. 1, 7, and 15. The clamps K K of Figs. 10 and 11 are the same as those of Figs. 3 and 4—that is, adapted to engage various sizes of tubing used for the frame F' by adjusting the two parts of the clamp K', while the adjustability in the case of Fig. 12 is obtained by a flexible metal band surrounding the tube F and having openings in its free ends, through which passes a rod R, which band is fastened by the nuts N N' at any point along the threaded portion of the rod R in adjusting the position of the band or shield S, attached to the lower part of the rod R, as shown, with respect to the sprocket-chain. This adjustability of the shield S is provided in the case of the constructions Fig. 10 by providing a separate piece or pin P, which may be screwed into any one of a number of threaded openings in the rod R and locked by a nut N, and in the construction Fig. 11 the part P, to which the shield S is attached, slides upon the rod R, as indicated by the dotted lines, and is provided with a slot through which projects a bolt D, by which the piece P is held in any desired position throughout its range of movement. In Fig. 12 there is also seen a sectional view of the chain with its covering applied and with the covering held in place by clips U having the form shown in Figs. 13 and 14— that is, with their edges bent inward, so as to engage with the edge of the link of the chain on its working face, but clearing the teeth of the sprocket-wheels by a suitable space.

In Fig. 5 is shown a preferable way of attaching the stationary shield or belt S to its support. It is desirable to support this shield as closely to the sprocket-chain as may be, and as the middle part of the chain sags downward somewhat during the forward motion of the bicycle it is necessary to have the ends of the shield quite close to the chain. When this is done, however, the chain is apt to rub against the shield S at its supports and abrade it or cut it off. To prevent this, the casing O is extended around the pin H, upon which pin the shield S, which is preferably a rubber band, is looped, as shown clearly in the figure. A separate piece of metal, such as a thin plate of steel, may be attached to the casing O in such manner as to cover the pin or support H and answers the same purpose. The rubber band S may be, when both the upper and lower working surfaces are shielded, looped over the pin H and then continued around a similar pin at the upper part of the casing, one at each sprocket-wheel, two pins to each casing, and so arranged a single thickness of the shield will exist before the face of each working surface instead of a double thickness, as indicated by the dotted lines in Fig. 5.

Having thus described my invention, what I claim, and desire to secure by Letters Patent, is—

1. In combination with a power-transmitting chain, a flexible cover inclosing the outer face of the chain and its opposite sides, leaving space on the inner side for the wheel to engage with the chain, and clips to hold the cover to the chain.

2. In combination, sprocket-wheels and a sprocket-chain therefor, a flexible covering or shield inclosing the outer surface and sides of the chain and adapted to move therewith, stationary shields supported so as to inclose the uncovered portions of the sprocket-wheels and a suitable shield secured between the outer ends of the stationary shield and adapted to protect the inner surface of the sprocket-chain.

NORMAN C. BASSETT.

Witnesses:
JOHN W. GIBBONEY,
HENRY O. WESTENDARP.